March 17, 1959
O. ERBE ET AL
2,877,651
COARSE AND FINE MOVEMENT FOR OPTICAL
INSTRUMENTS, ESPECIALLY MICROSCOPES
Filed June 12, 1953
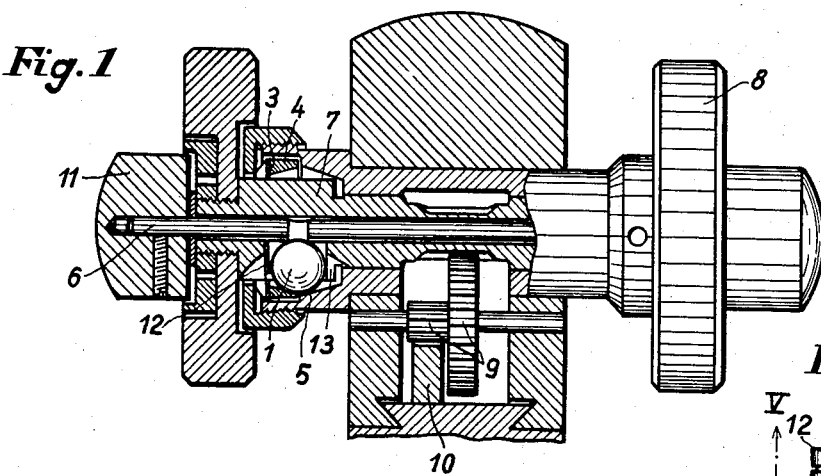
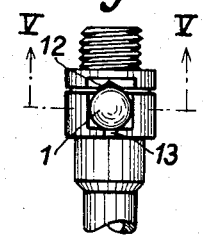
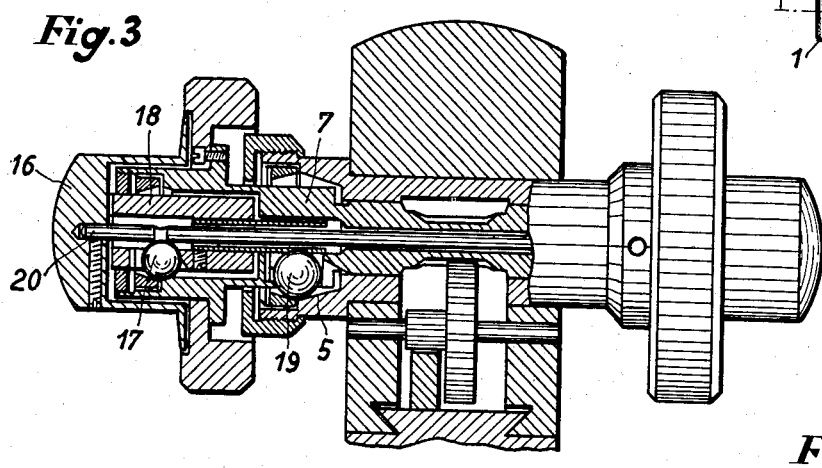
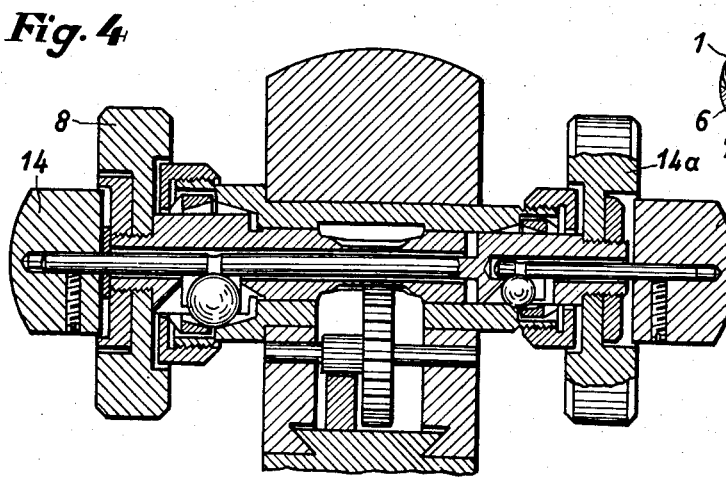

United States Patent Office 2,877,651
Patented Mar. 17, 1959

2,877,651

COARSE AND FINE MOVEMENT FOR OPTICAL INSTRUMENTS, ESPECIALLY MICROSCOPES

Otto Erbe and August Rakebrandt, Gottingen, Lower Saxony, Germany, assignors, by mesne assignments, to Carl Zeiss, Heidenheim (Brenz), Wurttemberg, Germany Application June 12, 1953, Serial No. 361,232

Claims priority, application Germany June 19, 1952

6 Claims. (Cl. 74—10.52)

In general, optical instruments with precision adjustment, especially microscopes, have one coarse and one fine movement for adjustment in most cases the coarse movement working on one guide control and the fine movement on a second guide control. In this case both parts are completely independent of each other. The disadvantages of this construction are that possibly two very precise controls are necessary and that unavoidable small errors of the individual controls combine by addition in the overall movement.

If the coarse and fine movements of certain instruments (e. g. angle-measuring instruments) both work on a single control, manipulation is complicated because when changing from the coarse to the fine movement a special clamping must be effected which brings the fine movement into operational position. In reverse, when re-employing the coarse movement the clamping must be released which, however, is often forgotten and the bearing is damaged by using force in trying to operate the coarse movement.

It is an object of the present invention to show a way in which the coarse and the fine movement of an optical instrument, especially a microscope, can work on a single joint control without bringing about the above-mentioned disadvantages. It is a further object of the invention to provide a ball friction means transmitting the rotary motion of the fine movement shaft to the coarse movement shaft. The coarse movement shaft in turn works on the control. It is a further object of the invention to provide means preventing any backlash between the fine movement shaft and the coarse movement shaft.

In the drawing, Fig. 1 is a longitudinal section through a sample of the invention; Fig. 2 is a view of the coarse movement shaft of Fig. 1; Figs. 3 and 4 are longitudinal sections through one other form of construction each, and Fig. 5 is a section along the line V—V in Fig. 2.

In Fig. 1 the coarse movement knob 8 is firmly connected with the coarse movement shaft 7. By turning knob 8, shaft 7 is moved and the rotary motion is transmitted to the control through the gear wheel transmission 9 and the rack 10. Here, the fine movement shaft 6 rests in the coarse movement shaft 7. The latter at the same time serves as a ball cage for the ball friction gear (Figs. 2 and 5). The three balls 1 are pressed over the loose tapered ring 4 against the rigid tapered surface 5. By the wedge effect the balls 1 are pressed against the friction surfaces of the fine movement shaft 6 and thus at the same time serve for the bearing of axis 6. By turning the fine movement knob 11, the coarse movement shaft 7 is moved at the same time through the friction of the balls 1, the fine movement shaft 6 and the tapered surfaces 4 and 5. The turning of the coarse movement shaft takes place in relation of the bearing diameter of the balls at shaft 6 to the bearing diameter of the balls at taper 5.

In conventional ball friction gears the balls are situated in cylindrical borings of the ball cage (Figs. 2 and 5). If these balls are to run without play so that a precise sequence is attained even if the direction of rotation is changed, the borings must be very accurately made. Nevertheless, after some use the boring movement of the balls will cause considerable wear and thus play in the ball cages. Thus, the normal friction gear is rendered unfit for use in instruments with precision adjustment. In order to eliminate these disadvantages of the conventional ball friction gear, the ball cage is specially constructed according to the invention (Fig. 2). The borings in the ball cage are larger than the diameter of the balls 1. Balls 1 are pressed into small recesses 13 in the coarse movement shaft 7 by V-shaped springs 12. Thus, the position of the rotating axis of the balls is defined accurately. Any possible wear is balanced by the tension in springs 12. For this reason even after a longer time period no deterioration of the transmission of the rotary motions will occur.

This principle also permits the connection in series of several ball friction gears by letting a fine movement first work on a medium fine movement and then the latter work on the coarse movement. Thus the transmission ratio is increased. In this connection it does not matter whether coarse movement, medium fine movement and fine movement are situated all on one or on different sides of the drive. For instance, a medium fine movement and a coarse movement can be placed on one side (e. g. the left-hand side), a medium fine movement and a fine movement on the other side (e. g. the right-hand side). In the same manner a coarse movement and a fine movement can be placed on one side and a coarse movement and a medium fine movement on the other.

In Fig. 3 the series-connected ball friction gears are situated on the left-hand side. Through the balls 17 the fine movement works on the medium movement 18 and that through balls 19 on the coarse movement shaft 7.

In Fig. 4, the fine movement 15 and the medium fine movement 14a are placed at the right-hand side, the medium fine movement 14 and the coarse movement 8 at the left, whereby the principle of ball friction is applied exactly as described above.

We claim:

1. In a co-axial coarse and fine movement for optical instruments with precision adjustment, especially for microscopes having a fine movement shaft and a coarse movement shaft, as well as a ball friction means and stationary reaction means, whose fine movement shaft is situated in said coarse movement shaft, and in which with said shafts said ball friction means is arranged and in which the coarse movement shaft is fashioned as a ball cage for the balls of said ball friction means, said balls lying between said fine movement shaft and said stationary reaction means, means to avoid play of the balls in said coarse movement shaft and on the other hand back lash between the coarse movement shaft and the fine movement shaft.

2. In a co-axial coarse and fine movement for optical instruments with precision adjustment, especially for microscopes having a fine movement shaft and a coarse movement shaft, as well as a ball friction gear, whose fine movement shaft is situated in said coarse movement shaft and in which between said shafts said ball friction gear is arranged and the coarse movement shaft is fashioned as a ball cage for the balls of said gear, axially directed prismatic recesses in the coarse movement shaft and V-shaped springs, the balls of said ball friction gear arranged between said recesses and said springs in such a way that the balls are pressed against said recesses by the springs and do not have any play in the coarse movement shaft, and a stationary bearing for the coarse movement shaft as well as a ring, said stationary bearing having a conical surface and said ring being slidably arranged and having also a conical surface, said balls lying between the said conical surfaces of said stationary bearing and said ring, a spring acting upon said ring to press said ring against said balls in the direction of the coarse movement shaft.

3. Co-axial coarse and fine movement in accordance with claim 1, characterized in that turning knobs are provided attached to both ends of the fine movement shaft.

4. Co-axial coarse and fine movement having several ball friction gears as in claim 1, said gears being connected in parallel in order to attain a greater transmission ratio than with one ball friction gear.

5. Co-axial coarse and fine movement according to claim 1, characterized in that on one driving side a coarse and a medium fine movement are provided having an intermediate ball friction gear and on the other driving side a medium fine movement and a fine movement are provided having an intermediate ball friction gear.

6. Co-axial coarse and fine movement according to claim 1, characterized in that on one driving side a coarse and a medium fine movement are provided having an intermediate ball friction gear and on the other driving side a coarse and a fine movement are provided having also an intermediate ball friction gear.

References Cited in the file of this patent
UNITED STATES PATENTS

| | | |
|---|---|---|
| 1,993,820 | Behringer | Mar. 12, 1935 |
| 2,095,279 | Newman | Oct. 12, 1937 |